Patented Apr. 17, 1934

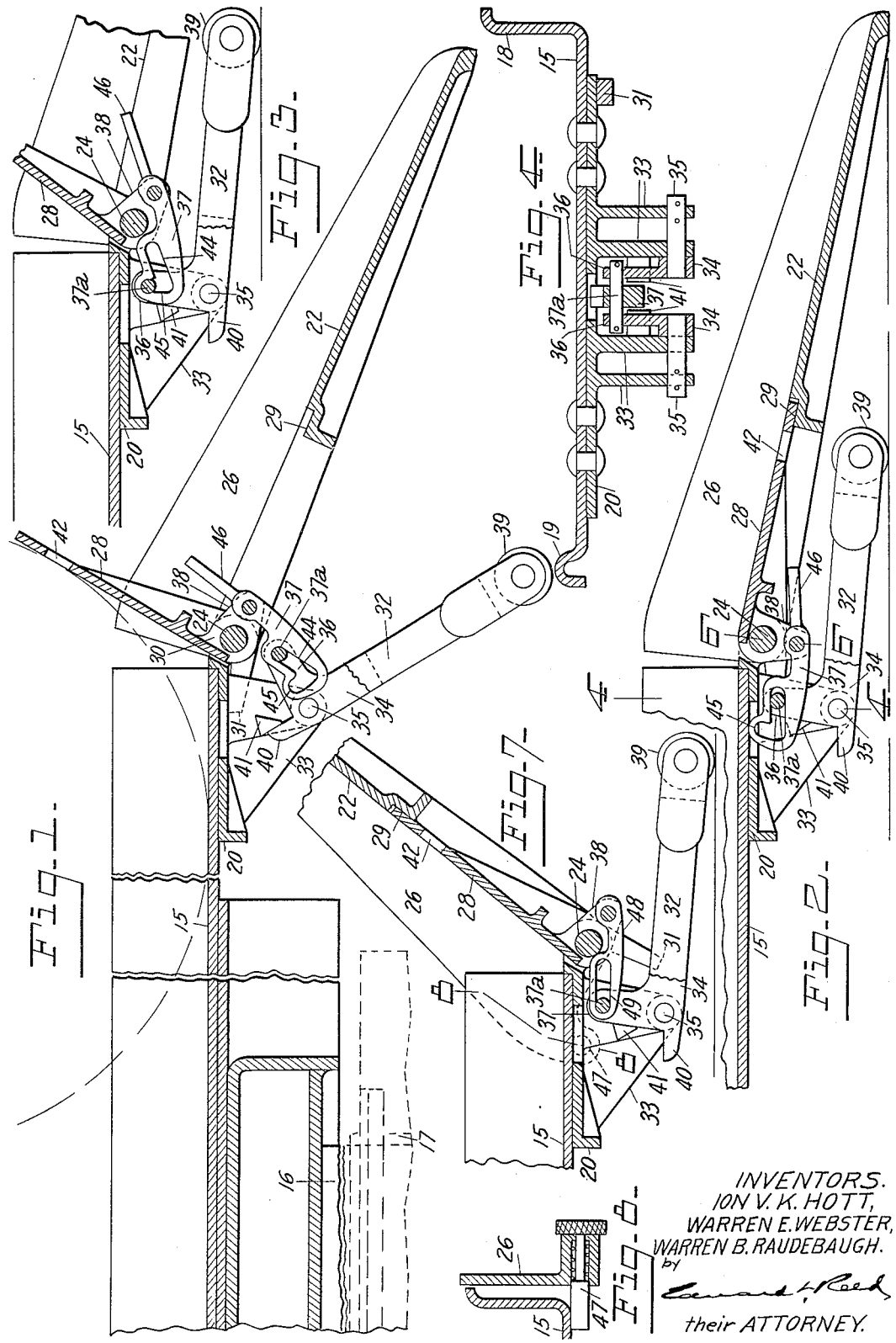

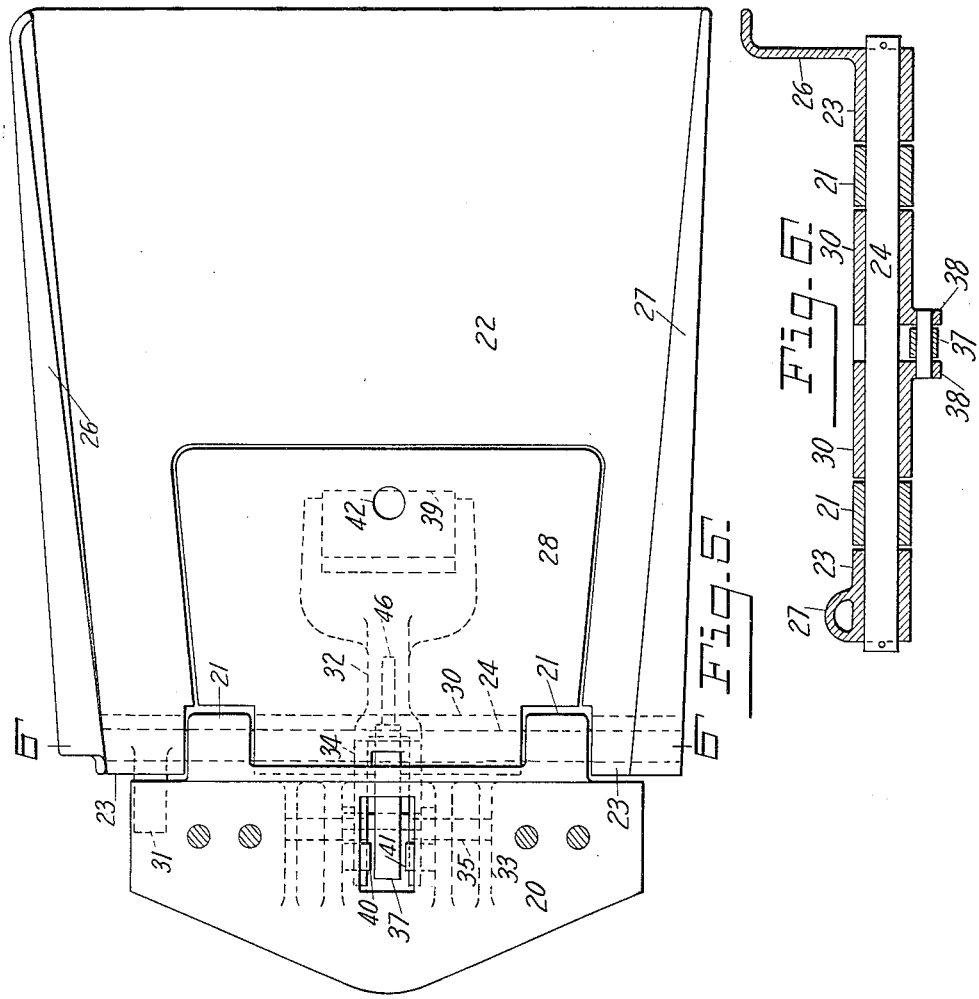

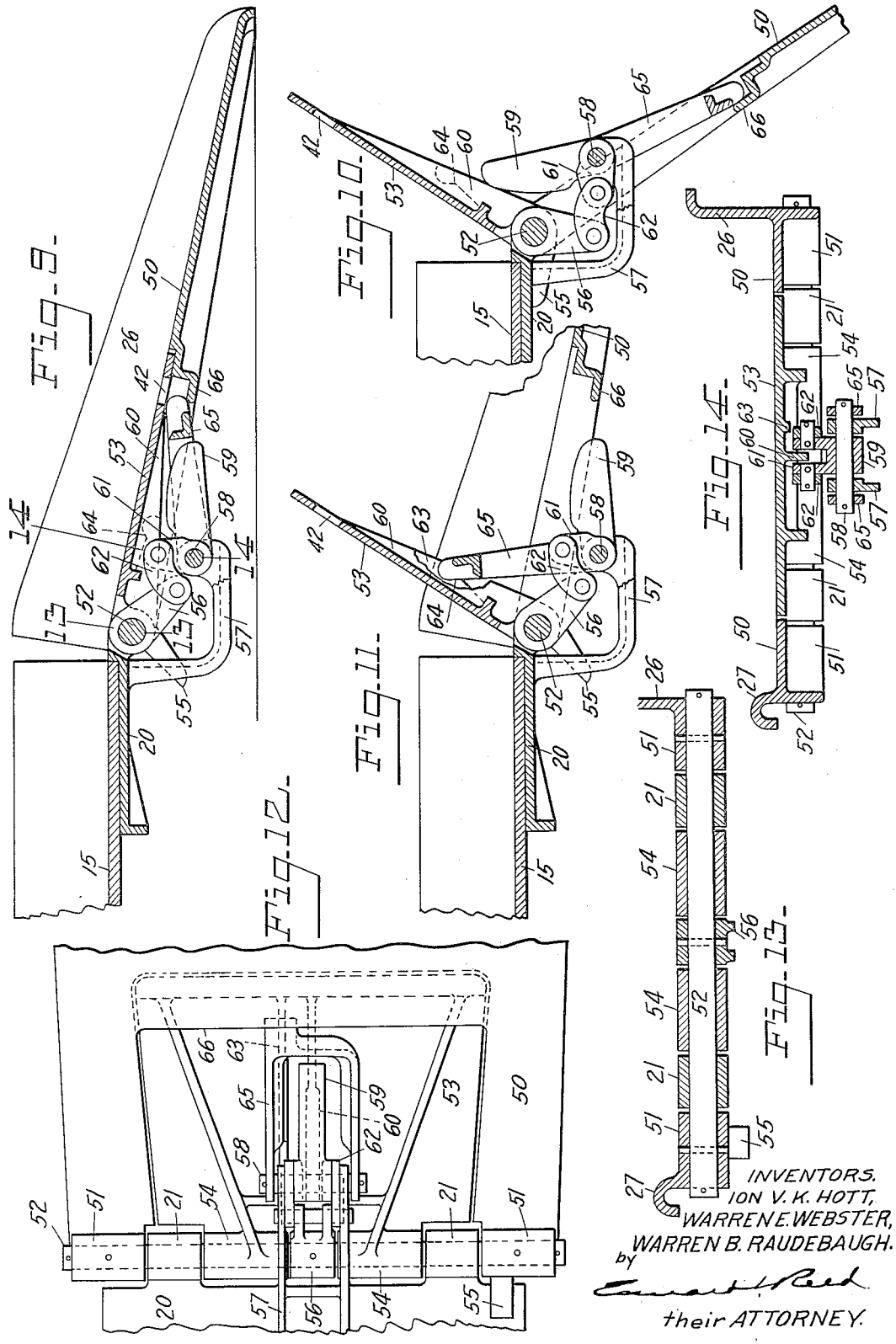

1,955,586

UNITED STATES PATENT OFFICE 1,955,586

COMBINED RAMP AND STOP DEVICE

Ion V. K. Hott, Warren E. Webster, and Warren B. Raudebaugh, Dayton, Ohio, assignors to The Joyce-Cridland Company, Dayton, Ohio, a corporation of Ohio Application January 3, 1933, Serial No. 649,938

15 Claims. (Cl. 254—89)

This invention relates to a combined ramp and stop device for a vertically movable runway, such as is commonly employed in connection with automobile lifts and the like. When an automobile lift is in its lowermost position the runways are usually spaced some distance above the surface of the ground or pavement and are provided with ramps or inclined guides to facilitate the movement of the vehicle wheels from the ground onto the runway. It is desirable that such a runway should be provided with a stop device to prevent the vehicle wheels from running off the same when it is in an elevated position and the ramp or a part thereof is sometimes employed as this stop device by so mounting the same that either the ramp as a whole or a part of the ramp may be moved to an elevated position.

One object of the present invention is to provide a ramp mechanism of such a character that the ramp or a part thereof may be moved to an elevated position, in which it will form a stop, either automatically under the control of the lift or by hand while the runway is in its lowermost position.

A further object of the invention is to provide a ramp having a separately movable part to constitute the stop device and to provide the same with gravity operated means for automatically moving that part into its elevated position.

A further object of the invention is to provide such a combined ramp and stop device with a gravity operated device separate from the ramp for moving the stop device to its elevated position and for locking the same in that position.

A further object of the invention is to provide such a combined ramp and stop device having gravity operated means for moving the stop device to its elevated position and having means operable either by the gravity operated means or by hand to retain the stop device in its elevated position.

Other objects of the invention will appear as the mechanism is described in detail.

In the accompanying drawings Fig. 1 is a longitudinal sectional view of a portion of an automobile lift and a combined ramp and stop device, showing the stop device in its operative position; Fig. 2 is a sectional view of a portion of the runway and ramp showing the stop device in its inoperative position; Fig. 3 is a similar view showing the stop device as having been moved to its elevated position independently of the gravity operated actuating device; Fig. 4 is a transverse sectional view taken on the line 4—4 of Fig. 2; Fig. 5 is a plan view of the combined ramp and stop device; Fig. 6 is a sectional view taken on the line 6—6 of Fig. 5; Fig. 7 is a sectional view of portions of the runway and ramp showing the ramp as a whole elevated to move the stop device to its operative position; Fig. 8 is a sectional detail view of a locking device to retain the ramp in the position shown in Fig. 7; Fig. 9 is a sectional view taken through the ramp and a portion of the runway showing a modified form of operating mechanism for the stop device and separate means for locking the stop device in its elevated position; Fig. 10 is a similar view showing the positions of the parts when the stop device has been elevated by the gravity operated device; Fig. 11 is a similar view showing the positions of the parts when the stop device has been elevated and locked by hand; Fig. 13 is a section taken on the line 13—13 of Fig. 9; and Fig. 14 is a section taken on the line 14—14 of Fig. 9.

In these drawings we have illustrated several embodiments of our invention but it will be understood that these particular embodiments have been chosen for the purpose of illustrating the invention and that the mechanism may take various forms and arrangements without departing from the spirit of the invention.

As shown in Figs. 1 to 6 the combined ramp and stop device is applied to the runway 15 of an automobile lift. The runways of the lift, one only of which is shown, are supported by a vertically movable ram 16 mounted in an underground cylinder 17 and operated in a well known manner to raise and lower the runways. The runway may be of any suitable construction but, as here shown, it has at its inner side a vertical flange 18 to retain the vehicle wheels thereon and has at its outer side a relatively low flange or bead 19. Rigidly secured to the underside of the runway, at the end thereof, is a bearing plate 20 having bearing lugs 21 which project beyond the end of the runway and constitute supports for the ramp. The main or body portion 22 of the ramp is provided at its rear edge with bearing lugs 23 arranged in line with the bearing lugs 21 and connected thereto by a hinge pin 24. The body portion of the ramp is preferably provided on one side with a vertical flange 26 and on its other side with a relatively shallow bead 27, as shown in Fig. 6, but obviously it may be of any suitable shape. The stop device comprises a separately movable part of the ramp and is here shown as a plate 28 arranged in a suitable opening in the upper portion of the ramp and supported at its forward edge on a shoulder 29 on the body portion of the ramp, which shoulder is so arranged that the upper surface of the stop plate 28, when the latter is in its normal position, is substantially flush with the upper surface of the body of the ramp. The stop plate 28 is provided at its rear edge with pivot lugs 30 mounted on the hinge pin or shaft 24. Both the body portion of the ramp and the stop plate 28 are loosely mounted on the hinge pin so that they may have movement about this axis with relation one to the other.

In this particular arrangement of the mechanism the downward movement of the body portion of the ramp, about the hinge pin, is limited by inwardly extending fingers 31 which engage the bearing bracket 20, and a separate gravity operated device is provided for actuating the stop plate 28. Preferably this gravity operated device comprises a lever 32 supported by the runway on an axis arranged somewhat below the hinge pin 24. In the present construction, the bearing plate 20 of the runway is provided with depending lugs 33 on which the gravity operated lever is supported. As here shown, the rear or inner end of the lever is bifurcated and the arms 34 thereof are supported respectively by pivot pins 35 mounted in the lugs 33, as shown in Fig. 4. Rigidly secured to each arm of the bifurcated end of the lever 32 is an upwardly extending crank arm 36 which is connected by a link 37 with a downwardly extending crank arm 38 connected with the stop plate 28 and preferably formed integral with the bearing 30 thereof. The link 37 is arranged between the two crank arms 36 and pivotally connected therewith by a pin 37a so that the link and the crank arms constitute a toggle. The outer or forward end of the lever 32 is weighted and is preferably provided with a roller 39 to engage the ground or pavement.

When the runway is in its lowermost position, as shown in Fig. 2, the outer end of the body portion 22 of the ramp will rest upon the ground and the stop plate 28 will be in its lower position. When the ramp is in its normal position the gravity operated lever 32 extends forwardly in an approximately horizontal position and its outer end rests on the ground beneath the inner portion of the ramp. When the runway is moved upwardly the ramp will move therewith, due to the contact of the fingers 31 with the runway, and the inner end of the lever 32 will also move upwardly with the runway but the outer end of the lever will remain in engagement with the ground during the initial upward movement of the runway, the lever being thus moved about its axis 35. This pivotal movement of the lever imparts a forward or outward movement to the crank arms 36, which movement is transmitted through the link 37 to the crank arm 38 on the stop plate 28, thereby elevating that plate from the position shown in Fig. 2 to the position shown in Fig. 1. When the plate has been moved to its final elevated position the intermediate axis 37a of the toggle will have been moved slightly below the axes of the respective ends of the toggle, thereby locking the toggle in its extended position and locking the stop plate in its elevated position. The movement of the lever 32 about the pivot pins 35 is limited by a finger 40 which engages a stop 41 on one of the brackets 33 and the lever is thus supported in an inclined position with relation to the runway so that when the latter is lowered the roller at the outer end of the runway will engage the ground and the lever will be rocked about its axis by the continued downward movement of the runway to break the toggle and restore the stop plate to its normal position.

When it is desired to move the stop plate 28 to its elevated position while the runway is in its lowermost position it is grasped by the hand and moved about the hinge pin 24, the plate being provided with a hand hole 42 to enable the same to be firmly gripped by the operator. To permit this upward movement of the stop plate with relation to the gravity operated lever 32 the connection between the crank arms 36 and the link 37 is a lost motion connection, the link being preferably provided with a longitudinal slot 44 through which the pin 37a extends, thereby permitting the link to move forwardly with relation to the crank arms 36 when the stop plate is elevated. The slot 44 has at its rear end an upward extension 45 which forms a locking recess and when the link has been moved to its foremost position it will drop by gravity to cause this locking recess to embrace the pivot pin 37a and thus lock the stop plate in its elevated position. When the stop plate is to be lowered the link is moved upwardly to disengage the locking recess from the pin, and it is preferably provided with a handle 46 to facilitate this movement thereof.

Instead of moving the stop plate upwardly with relation to the body portion of the ramp, as above described, it may be moved to its elevated position by swinging the ramp as a whole upwardly about the hinge pin 24, as shown in Fig. 7. When this method of operation is contemplated the ramp is provided with a locking device to engage the runway and retain the same in its elevated or stop position. This locking device may conveniently take the form of a spring pressed plunger 47, as shown in Fig. 8, which is carried by the flange 26 of the ramp and is adapted to engage beneath the end portion of the runway 15. The construction is the same as that shown in Figs. 1 to 6 with the exception that the link 48 is provided with a straight slot 49, the locking recess 45 and the handle 46 being omitted.

In Figs. 9 to 14 we have shown a modified form of the apparatus in which the body portion of the ramp constitutes a gravity operated device for actuating the stop plate. As there shown, the runway 15 is provided with the bearing plate 20 and bearings 21 as before. The body portion 50 of the ramp has at its inner edge apertured lugs 51 mounted on and rigidly secured to the hinge pin 52 which is rotatably mounted in the bearings 21. The stop plate 53 has at its rear end two bearing lugs 54 rotatably mounted on the hinge pin and spaced one from the other. The body portion of the ramp is capable of downward movement by gravity with relation to the runway, this movement being limited by a finger 55 which engages beneath the runway and is so arranged as to permit the body portion of the ramp to move to the inclined position shown in Fig. 10. Rigidly connected with the hinge pin or shaft 52, which rotates with the body portion of the ramp, is a downwardly extending crank arm 56 which operates a device for actuating the stop plate 53. Rigidly secured to the bearing plate 20 of the runway is a forwardly extending bracket 57 the forward end of which is bifurcated and has mounted therein a pivot pin 58. Pivotally mounted on this pivot pin 58 is a cam 59 adapted to engage the lower side of the stop plate and impart upward movement thereto, the plate being here shown as having an inclined rib 60 on which the cam acts. Rigidly connected with the cam 59 and extending upwardly from the axis thereof is a crank arm 61 which is connected by links 62 with the depending crank arm 56 on the hinge pin 52.

When the runway is in its lowermost position, as shown in Fig. 9, the parts will occupy the positions there shown and when upward movement is imparted to the runway the outer end of the body portion of the ramp will be held by gravity in engagement with the ground during the initial upward movement of the runway, thus causing the hinge pin 52 to rotate and thereby moving the crank arm 56 rearwardly and actuating the cam 59 to elevate the stop plate. The crank arm 61 and the link 62 constitute a toggle which is moved to its extended position when the stop plate is moved to its elevated position.

The stop plate 53 being loosely mounted on the hinge pin 52 can be moved to its elevated position independently of any movement of the body portion of the ramp or of the cam 59 and a separate manually operated locking device is provided for securing the same in its elevated position. As here shown, the stop plate has on its lower surface an inclined rib 63 which is provided with a notch or locking recess 64. A locking arm 65 is pivotally mounted in the bracket 57 and has its upper end arranged to enter the locking recess 64 when the stop plate is in its elevated position and thereby rigidly secure the same in that position. To lower the stop plate it is only necessary to release the locking arm 65 and lower the same to its normal position, in which position it rests upon a lug 66 carried by the body portion of the ramp.

The operation of the several forms of the device will be readily understood from the foregoing description and it will be apparent that in each of these forms the mechanism is provided with means adapted to be operated either manually or automatically to move a part of the ramp into an elevated position with relation to the runway, in which position it will prevent a wheel running off the end of the runway. The part which constitutes the stop may be moved to and locked in its operative position before any upward movement is imparted to the runway but if it is not so moved to operative position it will be automatically moved to that position by the initial upward movement of the runway, thus assuring the proper positioning of the stop device before the runway has been elevated to any considerable extent.

While we have shown and described several embodiments of our invention we wish it to be understood that we do not desire to be limited to the details thereof as various modifications may occur to one skilled in the art.

Having now fully described our invention, what we claim as new and desire to secure by Letters Patent, is:

1. In combination with a vertically movable runway, a ramp connected with one end of said runway and comprising a part arranged to be supported in an inclined position with relation to said runway when the latter is in its lowermost position, said part being movable either manually or by gravity into an elevated position in line with said runway, and means for retaining said part in said elevated position.

2. In combination with a vertically movable runway, a ramp connected with one end of said runway and comprising a part arranged to be supported in an inclined position with relation to said runway when the latter is in its lowermost position, said part being movable manually to an elevated position in line with said runway while said runway is in said lowermost position, and having means controlled by the vertical movement of said runway to automatically move the same to an elevated position when upward movement is imparted to said runway.

3. A combined ramp and stop device for a vertically movable runway comprising a member arranged normally in the path of a wheel moving onto said runway and having both gravity operated means and manually operated means for moving the same to an elevated position in line with said runway and for retaining the same in that position.

4. A combined ramp and stop device for a vertically movable runway comprising a part movably connected with one end of said runway, arranged to be supported in an inclined position with relation to said runway when the latter is in its lowermost position, and adapted to be grasped by the hand of the operator and moved to an elevated position in line with said runway while the latter is in said lowermost position, and a gravity operated part connected with the first mentioned part to move the same to said elevated position when upward movement is imparted to said runway.

5. A combined ramp and stop device for a vertically movable runway comprising a part pivotally connected with one end of said runway for movement from a normally inclined position to an elevated position in line with said runway, a gravity operated part pivotally connected with said end of said runway for movement with relation to said first mentioned part, means actuated by said gravity operated part to move said first mentioned part to said elevated position, said first mentioned part being movable to said elevated position independently of said gravity operated part, and means for retaining said first mentioned part in said elevated position.

6. A combined ramp and stop device for a vertically movable runway comprising a ramp connected with said runway and supported normally in an inclined position with relation thereto, said ramp having a part movable with relation thereto to an elevated position in line with said runway, a gravity operated device mounted for movement with relation to said ramp, and means for connecting said gravity operated device with said movable part of said ramp to move the latter to said elevated position when said runway is moved upwardly.

7. A combined ramp and stop device for a vertically movable runway comprising a ramp connected with said runway and supported normally in an inclined position with relation thereto, said ramp having a part movable with relation thereto to an elevated position in line with said runway, a gravity operated device mounted for movement with relation to said ramp, and a toggle for connecting said gravity operated device with said movable part of said ramp to move the latter to said elevated position when said runway is moved upwardly.

8. A combined ramp and stop device for a vertically movable runway comprising a ramp connected with said runway and supported normally in an inclined position with relation thereto, said ramp having a part pivotally mounted on said runway and provided with a crank arm, a gravity operated device pivotally mounted on said runway and having a crank arm, and a link connecting said crank arms and arranged to impart upward movement to said part of said ramp when said gravity operated device moves downwardly.

9. A combined ramp and stop device for a vertically movable runway comprising a ramp connected with said runway and supported normally in an inclined position with relation thereto, said ramp having a part pivotally mounted on said runway and provided with a crank arm, a gravity operated device pivotally mounted on said runway and having a crank arm, and a link connecting said crank arms and arranged to impart upward movement to said part of said ramp when said gravity operated device moves downwardly, said link and one of said crank arms having movement with relation one to the other to permit said part of said ramp to be moved upwardly independently of said gravity operated device.

10. A combined ramp and stop device for a vertically movable runway comprising a ramp connected with said runway and having a part pivotally mounted on said runway for movement with relation to said ramp to an elevated position, said part having a crank arm, a weighted arm pivotally mounted on said runway, extending beneath said ramp and having a crank arm, and a link pivotally connected with the first mentioned crank arm, having a slot extending lengthwise thereof, and having a locking recess at that end of said slot remote from its axis, and a pin carried by the last mentioned crank arm and extending through said slot.

11. A combined ramp and stop device for a vertically movable runway comprising a ramp connected with said runway and supported normally in an inclined position with relation thereto, said ramp having a part movable with relation thereto to an elevated position in line with said runway, a gravity operated device mounted for movement with relation to said ramp, means for connecting said gravity operated device with said movable part of said ramp to move the latter to said elevated position when said runway is moved upwardly, said ramp as a whole being pivotally connected with said runway for upward movement with relation thereto, and a manually operated device to secure said ramp in its elevated position.

12. A combined ramp and stop device for a vertically movable runway comprising a ramp having a main portion pivotally mounted on said runway, supported normally in an inclined position with relation thereto and movable upwardly from said normal position, a locking device to secure said portion of said ramp in its elevated position, said ramp also having a part pivotally connected with said runway separately from said main portion and movable upwardly with said main portion or separately therefrom, a gravity operated device mounted for movement with relation to said ramp, and means for connecting said gravity operated device with the last mentioned part of said ramp to move the same upwardly with relation to said main portion when said runway is moved upwardly.

13. In a combined ramp and stop device, for a vertically movable runway, a ramp comprising a part pivotally connected with said runway for downward movement by gravity, and a second part pivotally connected with said runway for movement to an elevated position in line with said runway and supported normally in substantial alinement with the first mentioned part, a device actuated by the downward movement of said first mentioned part to elevate said second part, said second part being movable to said elevated position independently of said device, and means to secure said second part in said elevated position.

14. In a combined ramp and stop device for a vertically movable runway, a ramp comprising a part pivotally connected with said runway for downward movement by gravity, and a second part pivotally connected with said runway for movement to an elevated position in line with said runway and supported normally in substantial alinement with the first mentioned part, a device actuated by the downward movement of said first mentioned part to elevate said second part, said second part being movable to said elevated position independently of said device, and a manually operated locking device to secure said second part in said elevated position.

15. In a combined ramp and stop device, for a vertically movable runway, a ramp comprising a part pivotally connected with said runway for downward movement by gravity, and a second part pivotally connected with said runway for movement to an elevated position in line with said runway and supported normally in substantial alinement with the first mentioned part, a cam pivotally supported by said runway to engage said second part and move the same to said elevated position, means for operatively connecting said first mentioned part with said cam, said second part being movable to said elevated position independently of said cam, and means to secure said second part in said elevated position.

ION V. K. HOTT.
WARREN E. WEBSTER.
WARREN B. RAUDEBAUGH.